US 8,108,504 B2

(12) United States Patent
Cox et al.

(10) Patent No.: US 8,108,504 B2
(45) Date of Patent: *Jan. 31, 2012

(54) NON-CENTRALIZED NETWORK DEVICE MANAGEMENT USING CONSOLE COMMUNICATIONS APPARATUS

(75) Inventors: Barry N. Cox, Austin, TX (US); James E. Dollar, Austin, TX (US); Matthew D. McClain, Austin, TX (US); Jeremy M. Conner, Austin, TX (US)

(73) Assignee: Uplogix, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/383,659

(22) Filed: Mar. 27, 2009

(65) Prior Publication Data
US 2009/0193118 A1   Jul. 30, 2009

Related U.S. Application Data

(63) Continuation of application No. 11/582,849, filed on Oct. 17, 2006, now Pat. No. 7,512,677.

(60) Provisional application No. 60/728,560, filed on Oct. 20, 2005.

(51) Int. Cl.
G06F 15/16 (2006.01)
G06F 12/00 (2006.01)

(52) U.S. Cl. .............................. 709/223; 709/250

(58) Field of Classification Search .......... 709/223–229, 709/238, 250
See application file for complete search history.

(56) References Cited

U.S. PATENT DOCUMENTS

| 4,996,703 | A | 2/1991 | Gray |
| 5,742,762 | A * | 4/1998 | Scholl et al. .............. 709/200 |
| 5,944,782 | A | 8/1999 | Noble et al. |
| 5,949,974 | A | 9/1999 | Ewing et al. |
| 6,029,168 | A | 2/2000 | Frey |
| 6,505,245 | B1 | 1/2003 | North et al. |
| 6,654,801 | B2 | 11/2003 | Mann et al. |
| 6,671,737 | B1 | 12/2003 | Snowdon et al. |
| 6,678,826 | B1 | 1/2004 | Kelly et al. |
| 6,792,455 | B1 | 9/2004 | DeLuca et al. |
| 6,816,197 | B2 | 11/2004 | Keshet et al. |
| 6,832,247 | B1 | 12/2004 | Cochran et al. |
| 6,850,985 | B1 | 2/2005 | Giloi et al. |
| 6,868,441 | B2 | 3/2005 | Greene et al. |
| 6,875,433 | B2 * | 4/2005 | Hart et al. ................ 424/159.1 |
| 7,139,811 | B2 * | 11/2006 | Lev Ran et al. ............ 709/217 |
| 7,174,360 | B2 | 2/2007 | Uemura et al. |
| 7,370,103 | B2 | 5/2008 | Hunt et al. |
| 7,512,677 | B2 * | 3/2009 | Cox et al. ................. 709/223 |
| 2002/0002606 | A1 * | 1/2002 | Jaffe ........................ 709/223 |

(Continued)

OTHER PUBLICATIONS

Mar. 10, 2008, Written Opinion, PCT/US06/40638.

(Continued)

*Primary Examiner* — Zarni Maung
(74) *Attorney, Agent, or Firm* — Hamilton, Brook, Smith & Reynolds, P.C.

(57) ABSTRACT

A apparatus for the management of one or more wide area or local area network connected devices by a collocated managing device. The managing device includes communications connectivity to each of the managed devices via a console connection and optionally via shared local area network connections. Additionally, the managing device includes a control system and a database. The device is designed to operate securely and operate autonomously or coupled with an external device, for example a management system, or a user.

26 Claims, 4 Drawing Sheets

U.S. PATENT DOCUMENTS

| | | |
|---|---|---|
| 2003/0055929 A1 | 3/2003 | Ding et al. |
| 2003/0187973 A1 | 10/2003 | Wesley |
| 2004/0255048 A1* | 12/2004 | Lev Ran et al. ............... 709/249 |
| 2005/0021702 A1* | 1/2005 | Rangarajan et al. .......... 709/223 |
| 2005/0060567 A1 | 3/2005 | Shannon et al. |
| 2005/0128512 A1 | 6/2005 | Kurotsu |
| 2006/0002705 A1 | 1/2006 | Cline et al. |
| 2008/0320136 A1* | 12/2008 | Holt et al. .................... 709/224 |

OTHER PUBLICATIONS

Mar. 10, 2008, International Search Report, PCT/US06/40638.

* cited by examiner

NON-CENTRALIZED NETWORK DEVICE MANAGEMENT USING CONSOLE COMMUNICATIONS APPARATUS

RELATED APPLICATION

This application is a continuation of U.S. application Ser. No. 11/582,849, filed Oct. 17, 2006 now U.S. Pat. No. 7,512,677, which claims the benefit of U.S. Provisional Application No. 60/728,560, filed on Oct. 20, 2005. The entire teachings of the above applications are incorporated herein by reference.

BACKGROUND OF THE INVENTION

The present invention relates generally to communications networks interconnecting disparate local and remote devices and network connections and, more particularly to non-centralized management of the various devices and connections of these communications networks, via console systems and methods remote from any centralized network database or control location or facility.

Enterprise resources for communications networks, such as wide area Ethernet networks (WANs), are conventionally managed from a central management location. Various software and hardware has been employed at the central location for the administration and management, and information technology personnel at the central location support these network operations. The central management location is, for example, the main office of a company that has geographically distant branch management offices. At the central management location, various database and network information, control, and facilitation systems and facilities are operated and accessed by administrator personnel. These central management systems and facilities perform a wide variety of overall network (i.e., enterprise) functions, including, for example, device and network information and data retention and storage, database operations, security, control, facilitations, enablement, authorization and permissions, and otherwise deal with the network as a whole.

Notwithstanding that the enterprise network functions have typically been centrally administered and managed, various remote devices and localized network connections for these networks must also themselves be administered, managed, and otherwise supported wherever located. These localized network connections and devices include, for example, local area Ethernet networks (LANs) at a branch office or the like. Administration, management and similar support for these localized network connections and devices often require local and dedicated facilities, systems, and personnel at each separate branch or segment.

Thus, any centralized management capability is, in fact, limited to only certain functions, operations, and activities. These centralized mechanisms rely on the use of the operational network to manage devices which are potentially responsible for the existence of a portion of that network. These automated "in-band" management techniques, such as SNMP, require the network in question to be functional. If this network fails, then the automated management infrastructure has no mechanism to connect to, much less manage such a device. Mitigation for these shortfalls have included: using human resources collocated with the remote network and devices; using duplicative and additional network communications paths to provide alternate paths in the event of failures; using remote console server functions which make the local device console and command line interfaces available to a human resource at a location separate from a remote location. Additional administration, management and support of the devices and network connections at each remote locale can be required, as well. Communications infrastructure, personnel and facilities can be pricey, manpower intensive, and duplicative because of the remote support requirements of conventional enterprise systems.

SUMMARY OF THE INVENTION

It would, therefore, be a new and significant improvement in the art and technology to provide systems and methods for non-centralized administration and management of communications networks that dispose of certain economical, personnel, duplication, scale and operational limitations inherent in centralized administration and management in conventional enterprise networks, where aspects of remote and disparate network elements, such as branch office LANs, WANs, and devices, must be remotely addressed, managed and administered. The present invention provides numerous advantages and improvements, including improvements and nuances in the foregoing respects.

An embodiment of the invention is a system for managing one or more communicatively connected remote devices of a local area network. The system includes a managing device, connected to a console connection (port) of the managed network device, located in the locale of the managed device, and a database resident in the managing device.

Another embodiment of the invention is a system for managing a wide area network including a plurality of networked communication devices at different locales. The system includes a managing device connected to one of the plurality of devices at a locale of at least one of the devices. The managing device is connected to the plurality of managed devices via their console connections and also communicatively connected to the wide area network. The managing device also includes a database communicatively connected thereto.

Yet another embodiment of the invention is a distributed network management system. The system includes a wide area network, more than one disparate and remote device, each communicatively connected to the wide area network, and a respective managing device connected distinctly to each of the more than one and disparate and remote devices.

Using the invention management of communications networks can dispose of certain economical, personnel, duplication, scale and operational limitations inherent in centralized administration and management in conventional enterprise networks, where aspects of remote and disparate network elements, such as branch office LANs and devices, would previously have been remotely addressed, managed and administered. The present invention provides numerous advantages and improvements, including improvements and nuances in the foregoing respects.

Another embodiment of the invention is a method of operation of a managing device communicatively connected to a network attached device for managing the device. The method includes connecting by the managing device to the managed device via a console communications path, checking by the managing device of a state of the managed device, sending a management command to the managed device, detecting a result indicative of the effect of the management command at the managed device, parsing the result by the managing device, storing the result by the managing device, and logging the interaction in a local secure storage.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
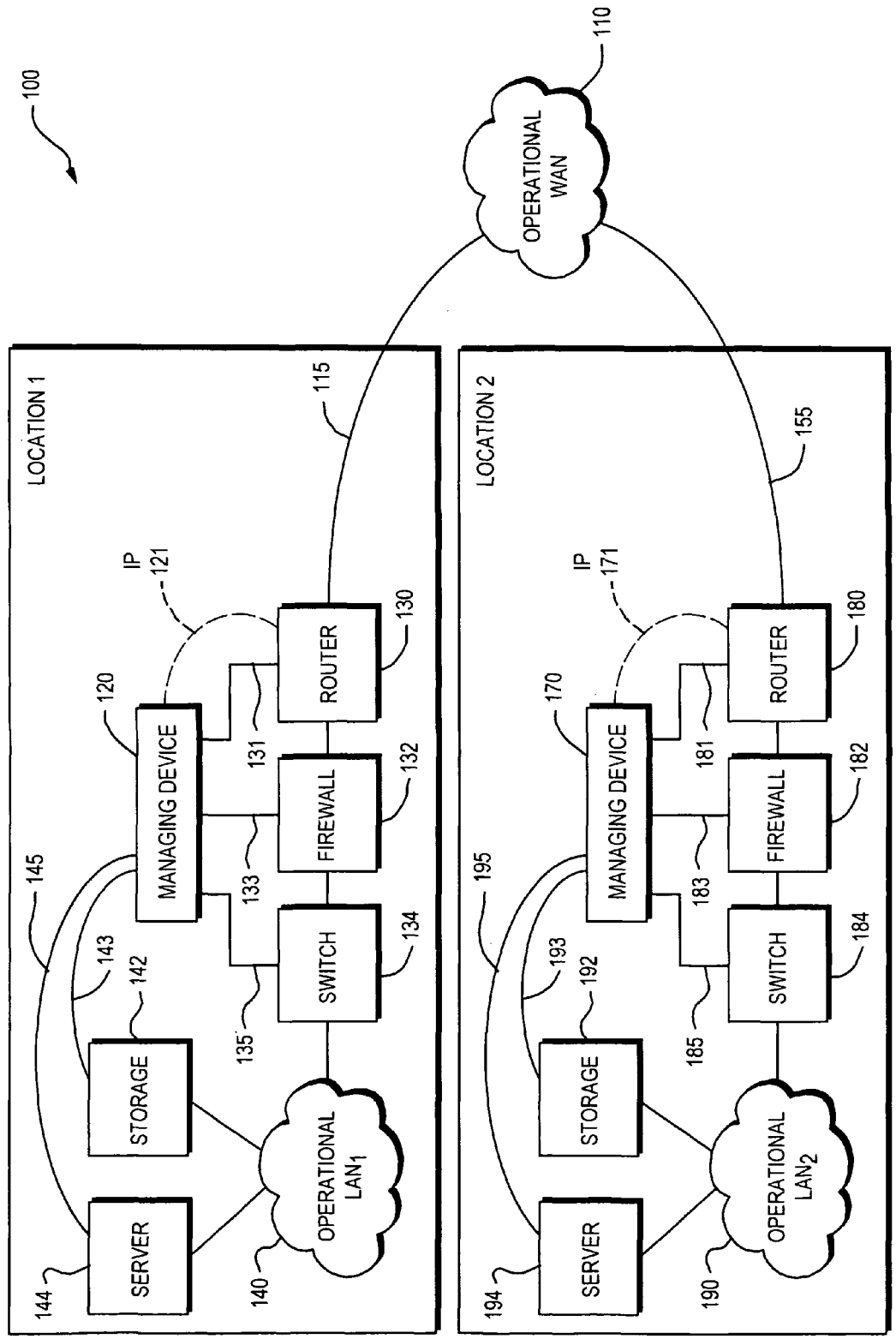
FIG. 1 illustrates an enterprise network, including a first local area network (LAN) and a second LAN, connected by a wide area network (WAN, wherein each of the LANs includes a respective managing device located at the LAN and connecting to managed devices of the LAN, according to certain embodiments of the invention.

Referring to FIG. 1, a system 100 for autonomously managing one or more collocated devices, includes a first managing device 120. The managing device 120 is connected to one or more of a router 130, a firewall 132, and a switch 134, a server 144, and a storage device 142, each of which connects to and interfaces with an operational local area network (referred to hereafter as "LAN") 140. The LAN connects to an operational wide area network (WAN) 110. The WAN 110 is, for example, the Internet or a dedicated wide area connection between the LAN 140 and remote geographic sites. The LAN 140 is, for example, any of wide variety of generally localized communications interconnections of devices and connection elements. Each of the WAN 110, the LAN 140, and other various devices and elements of the system 100, communicably interconnect by wired, wireless, or other communications connections or elements.

The system 100 also includes a second managing device 170. The second managing device 170 is substantially the same as the first managing device 170. A second router 180, a firewall 182, and a switch 184, a server 192, and a storage device 194, at or in the vicinity of a geographic location remote from the location of the LAN 140, each connect to and interface with a second local area network 190 (referred to hereafter as "LAN2"). The LAN2 190 connects to the WAN 110 via the second router 180 and the second switch 184.

As is typical, the system 100 enables communications between the LAN 140 and the LAN2 190 over the WAN 110, and between the various devices of each of the LANs.

The system 100, however, includes the first managing device 120 and the second managing device 170 for local autonomous management of the connected devices. The first managing device 120 is generally located at the location of the LAN 140. The second managing device 170 is generally located at the location of the LAN2 190, remote from the LAN 140 location. The first managing device 120 administers and manages the connected elements on LAN 140, including its various elements, connections and aspects. The second managing device 170 administers and manages the connected elements on LAN2 190, and its various elements, connections and aspects. Thus, each separate managing device 120 and 170 is geographically located at the respective LAN 140 or LAN2 190, which the particular managing device 120 or 170 thereat administers and manages the connected managed devices.

Each managing device 120, 170 operates in substantially the same manner. In particular, each managing device 120, 170 manages the respective managed devices connected to and/or controlling LAN 140 or LAN2 190. This contrasts with conventional network administration and management functions that have been performed from centralized facilities, rather than at respective remote geographic location for the network enterprise. This also contrasts with "agent" based local management functions, which require that managing software be installed and operating on the managed device itself.

Additionally, referring to FIG. 1, the managing device 120 manages the connected devices by connecting to the devices via the device console connections. Each device router 130, firewall 132, switch 134, server 144, or storage 142 that supports a corresponding console connection, including a router console connection 131, firewall console connection 133, switch console connection 135, server console connection 145, or storage device console connection 143, or other device supporting a console connection, can be managed by the managing device 120 independent of the connections to any devices or networks such as LAN 140.

A "console connection" as used herein, may include a serial port that provides visibility to intercept input/output commands made to and received from the device such as may be a keyboard/screen interface, command line interface (where commands are intended to entered as sequences of typed characters from a keyboard, and output is also received as text) or similar interface.

The managing device 120 can additionally connect to the LAN 140 directly to communicate with LAN 140—connected devices and networks. The managing device 120 can construct and communicate synthetic transactions to simulate normal network transactions and thereby measure various network based services, their performance and availability. However, a management connection can also be provided via the device console connections (131, 133, 135, 145, 143), rather than through the LAN connection that normally carries data traffic between network devices, as will be understood below.

Figure 2:
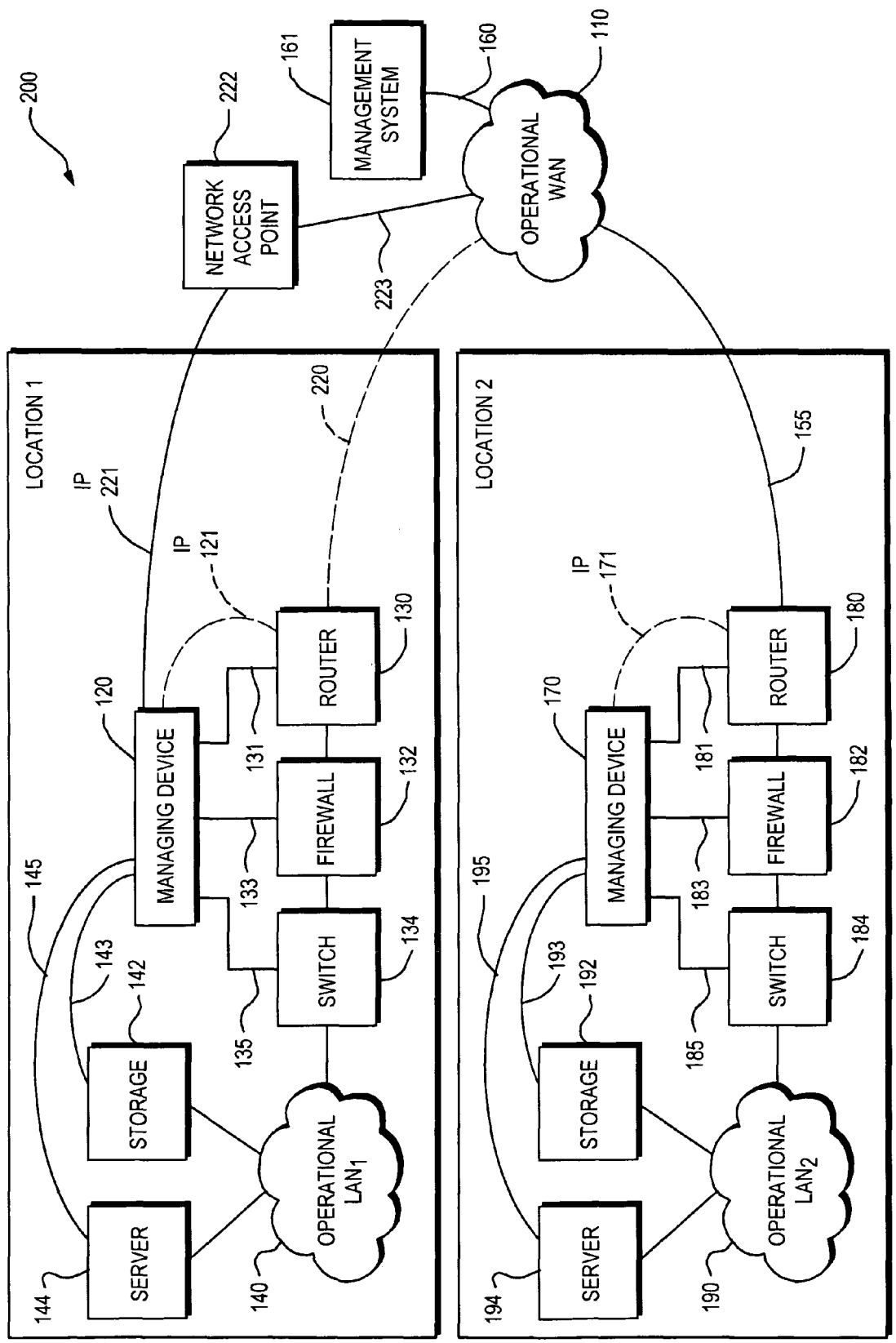
FIG. 2 illustrates another view of the enterprise network of FIG. 1, wherein an external device not in the locale of the managed devices is connected to the managing device via the primary WAN connection path, and wherein the primary WAN connection path of the second LAN has been interrupted and a secondary network connection is established by the managing device, according to certain embodiments of the invention.

FIG. 2 illustrates another embodiment in which the managing device 120 connects to the WAN 110 via the same connection 220 that the LAN 140 uses for connection to the WAN 110, but may also make use of another connection 221. The managing device 120 can send and receive data to an external device, such as management system 161 which is also connected to WAN 110 via path 160. Managing device 120 also periodically connects to the WAN 110 via an alternate communications connection 221. The alternate communications connection 221 is initiated and established by the managing device 120 by establishing a point to point connection to a network access point 222 that is also communicatively connected via connection 223 to WAN 110. The alternate communications connection 221 provides for continued communicative access over the WAN 110 for continuance of the exchange of data with external devices such as management system 161 or other managing device 120. For example, even if a primary connection 220 of the LAN 140 to the WAN 110 is interrupted, the managing device 120 accesses the WAN 110 via the alternate communications connection 221 and can therefore still manage devices 130, 132, 134, 142, 144.

The alternate communication mechanism 221 may be provided by a modem communicatively connected to managing device 120, which serves to provide the desired ancillary external communications access. This alternative communications access pathway should be independent of the typical LAN connection to the WAN. If and when primary communications paths of the LAN and WAN, such as over a router-connected Ethernet connection, are unavailable or interrupted, the managing device 120 can then automatically externally maintain access via the alternate communication mechanism (e.g., over a plain old telephone service (POTS) line or other communications vehicle.) By this operation, the managing device 120 can continue administering the LAN and its elements notwithstanding loss of primary WAN access.

Additionally, the respective console connections 131, 133, 135, 143, and 145 provide for continued communicative access to the LAN 140 connected devices, even if LAN 140 is no longer operational. For example, if LAN 140 operation is interrupted for any reason, normal management communication via LAN 140 or via WAN 110 through connection 220 is no longer available. However, management functions can continue by the managing device 120 via the said console connections. In combination with the alternate communications connection 221, manage functions and communication with the external devices 161 can continue, despite the failure of the key connectivity of LAN 140. As more fully later described, the autonomous controller functions of the managing device, together with the back-up communications possible via the alternate communications connection of the managing device, provide for more complete, continuous, and thorough non-centralized administration of the LAN via the managing device. The managing device, as hereafter detailed, eliminates the need for much of the manual administration previously required at the location of the LAN.

Figure 3:
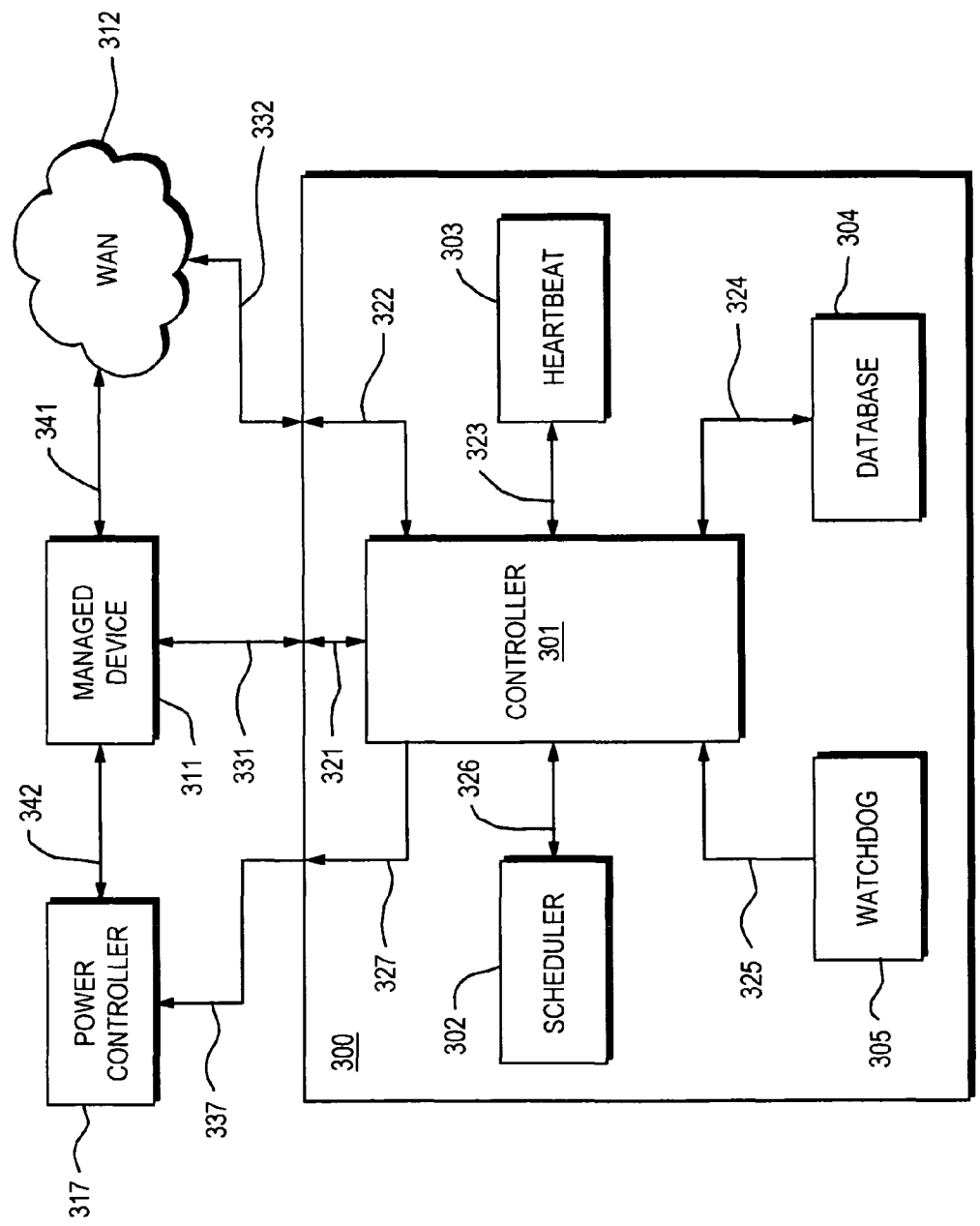
FIG. 3 illustrates a system block diagram of the managing device of FIGS. 1-2 (i.e., each managing device is substantially the same for the respective LANs), including a controller and database, according to certain embodiments of the invention.

FIG. 3 illustrates a managing device 300 (referred to as 120, 170 in FIG. 1) arrangement that includes a communications connection 331 for a managing device 300 to a managed device 311 (e.g., any of the router, switch, firewall, server, storage or other managed network elements that were shown in FIGS. 1 and 2) which in turn is connected by network connection 341 to the WAN 312 (e.g., 110 in FIG. 1 or 220 or 221 in FIG. 2). The managing device 300 may also be communicatively connected 322 to the WAN 312 via a shared local area network (LAN) connection 341 through the managed device 311, or via an alternate communications path 221 (as shown in FIG. 2). The managing device 300 may also be communicatively connected to a power controller device 317, which in turn permits control over the application of power to the managed device 311, via a power cord connection 342 and communications connection 337.

The managed device 300 includes a controller function 301 to perform autonomous functions, to communicate 321 with connected managed devices 311, to turn off and turn on power via communications connection 337, and to send and receive data from external devices 161 (FIG. 1) via LAN communications connection 341 or alternate point to point communications path 332 to WAN 312. The autonomous functions of the managing device 300 include communicating with one or more managed devices 311, translating requested operations from external devices 161 or a user into a managed device specific set of command interactions, monitoring the status of managed device 311, detecting the failure of managed device 311 function, analyzing and storing data derived from the monitoring data from managed device 311, monitoring the status of the network connection 341 to WAN 312, heuristically determining when to establish the point to point alternate communication path 332 to WAN 312, and heuristically determining when to command the power controller 317 to turn off or turn on power to the managed device 311.

The autonomous functions of the controller 301 enable management of the managed devices 311 and the local area network connection 341, including its devices and elements, either independently of or in concert with management sources available over the WAN 312 but remote from the general locale of the managing sources. The controller 301 also autonomously creates synthetic transactions to send to another device on the connected network, the device being managed or unmanaged, via a network communications path 322 (e.g. IP communications path 122 on FIG. 1) to simulate normal network transactions and thereby measure various network based services, their performance and availability. These synthetic transactions can also be used to detect the failure of network segments and services.

The managing device 300 also includes a database 304. The controller 301 connects to the database 304. The database 304 comprises a wide variety of information including configuration information, software images, software version information, user authentication and authorization information, logging information, data collected from connected devices, and data collected from various monitoring functions of the controller 301, and is capable of performing various database operations. The database 304 performs many of the same operations and has much of the same features as a typical network administration database of a centralized network administrator (including software, hardware, and/or human administration pieces); however, the database 304 is included in the managing device 300 and provides the administration functions locally at the LAN 341 where the managing device 300 is located.

For example, the database 304 can store and manipulate configuration data for devices and elements connected to the managing device 300, such as devices and elements of the LAN 341 connected to the WAN 312, as well as configuration information for the managing device 300, itself.

Moreover, the database 304 of the managing device 300 includes logging data. The log data includes audit information from communication sessions with managed device 311, state and update information regarding the elements and devices connected to the managing device 300, and also for the managing device 300. The logging information in database 304 may also include user interaction data as captured via autonomous detection of data entered by a user via the console connection(s).

The database 304 also includes software images and version information to permit upgrade or rollback the operating systems of managed devices 311. The database 304 also includes data on users, groups, roles, and permissions which determine which users can access which functions and resources through managing device 300 as well as the functions and resources of managing device 300 itself.

The database 304 also includes rules and threshold values to compare to other state information stored by the controller 301 which the controller 301 uses to determine if it should initiate communication with any connected devices on LAN 341 or remote external devices 161 through the communications with WAN 312.

The database 304 also typically includes other data as applicable to the environment and usage of the managing device 300 in administering the LAN 312 in concert with other similar implementations of the managing device 300 in other remote locations and with other LANs of a WAN network enterprise.

The controller 301 is connected to a scheduler 302 of the managing device 300. The scheduler 302 provides timing and situational triggering of operations of the managing device 300 as to each particular element and device of the LAN 341 and also as to the WAN 312 and external sources available over the WAN 312 for local administration of the LAN 341. For example, the scheduler 302 periodically, at time intervals dictated by configuration information from database 304 of the managing device 300, causes the controller 301 to check a state of the LAN 341 or a device or element thereof. Additionally, for example, the scheduler 302, upon detecting or recognizing a particular occurrence at the LAN 341 or its devices or elements, can invoke communications by the managing device 300 externally over the WAN 110 in order to obtain administration data from external devices to the LAN 341 and managing device 300, such as from a centralized or other external database or data warehouse.

The watchdog 305 function of the managing device 300 monitors the controller 301 to determine if the controller 301 is still operationally functioning. If the watchdog function determines that the controller is no longer operational, the watchdog 305 will cause the controller 301 to restart.

The controller 301 can also be connected to a heartbeat function 303 which, on a schedule determined by the scheduler 302, attempts to communicate to remote external devices 161 via the LAN 341 connection to WAN 312. Should the communication path via LAN 341 not respond, then the controller will initiate the establishment of an alternate point to point communication path 332 to WAN 312.

The foregoing examples are intended only for explanation of the localized autonomous management functions at the LAN 140, 170, made possible by the managing device described herein, and are not intended and should not be construed as limiting or exclusionary. In practice, the managing device described herein performs most, if not all, of the administration operations for an enterprise network, albeit that the managing device administers only the local network or LAN either independent of or in synchrony and cooperation with the overall enterprise network (which can comprise multiple ones of the managing device for multiple LANs ultimately included within the aggregated network enterprise. The managing device so administers the LAN (rather than a centralized administration for an entire enterprise WAN. Moreover, as hereinafter further described, each managing device can, itself, be accessed remotely, for at least certain administration operations for the LAN made remote from the LAN.

Figure 4:
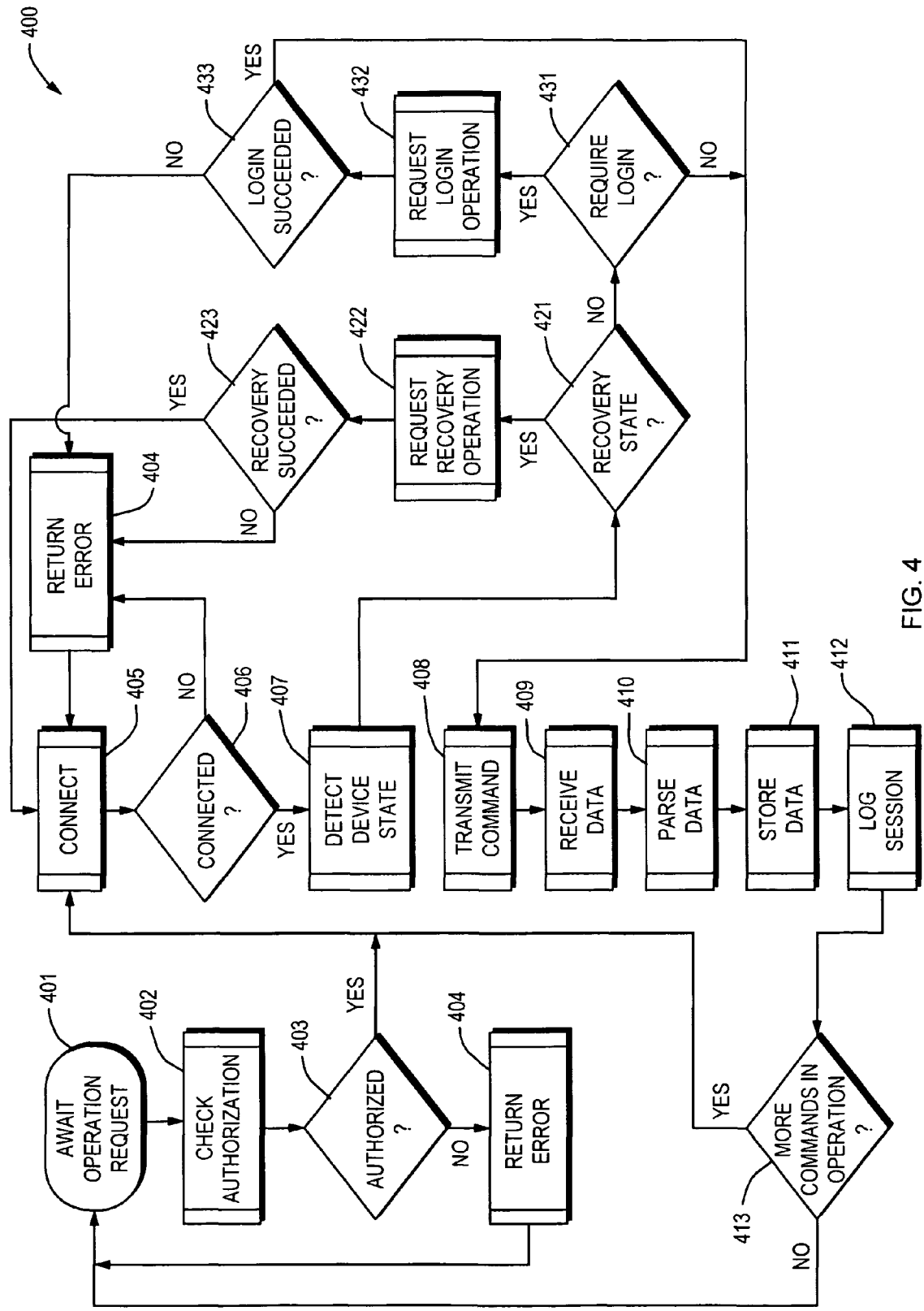
FIG. 4 illustrates a method of operation of the managing device of FIGS. 1-3, in managing the managed devices connected to the managing device, which includes determining the operation to perform on the managed device, connecting to managed device, detecting state of managed device, transmitting commands to managed device, receiving data from managed device, parsing received data, storing received data in database, and logging communications with managed devices.

FIG. 4 illustrates a method 400 of performing autonomous operations of the managing device of FIGS. 1-3. A request to perform an operation can come from an autonomous controller 301 process or a user. The performance of the operations includes a step of determining the authorization 402 of the requesting agent to perform the requested operation. The request information is compared to authorization in the local database 304, or alternatively sent to an authorization function communicatively connected to the managing device but located outside of the managing device (such as a TACACS, Radius, LDAP, or certificate authority).

The method then determines whether the operation request is authorized in step 403. If it is not, then a step 404 returns an error to the requestor. If the request is authorized, then in the next step 405 a connect is performed.

In the step of connecting 405, the managing device is physically connected to the managed device (shown in FIGS. 1-3), and seeks to communicably connect with a managed device. If the step of connecting 405 does not communicably connect within a certain time period as determined from the database 304, then an error 404 is returned to the requester. However, if the managing device successfully connects with the managed device of step 405, then the method 400 proceeds to a step 407 of managed device state checking.

In a state checking step 407, various operations are performed by the managing device, in communication with the managed device, to determine a current state of the managed device. The device state check step 407 includes a step 421 of determining whether the managed device in a "recovery" state. A "recovery" state is any state in which the managed device is not ready to accept a command. If the managed device is in a "recovery" state, then the next step recovery operation 422 is performed. The recovery operation attempts to communicate with the managed device to cause it to reset itself, restore itself by rebooting an operating system image when a low level boot state indicates that an operating system image is bad, or to cause a connected power controller 317 to turn off and turn on the managed device. In step 423, the method determines if the device recovery was successful. If the recovery was not successful, then an error 404 is returned to the requester. If the recovery was successful, the next step is to return to connect 405 in an attempt to again perform the original operation requested in 401.

If the managed device is in a state to receive commands, then method determines if the managed device is ready to receive commands other than the login commands 431. If the managed device is not ready to receive commands other than login, then the next step request login operation 432 is performed. The request login operation 432 sends the necessary authentication commands to the managed device in an attempt to place the device into a "logged-in" state. If the request login operation 432 does not succeed in placing the managed device in a "logged-in" state, then an error is returned to the requester.

If the managed device is in a "logged-in" state, then the device is ready to receive functional commands, and the next step 408 a transmit command is performed. Each requested operation may consist of one or more commands that are sent to the managed device, as well as one or more recognized response patterns. The transmit command function 408 determines the correct command to send to the managed device based upon the device state, and send that command string. In one preferred embodiment, the commands are sent and received via a console communication interface (console port) that uses a command line interface, as mentioned previously.

The next step of the method 400 is to receive data in step 409. The receive data step 409 collects the byte stream of data received from the managed device for a period of time specific to the managed device. The receive data step 409 attempts to determine whether the managed device has completed sending a stream of data in response to the transmit command step 408. If the receive data step 409 either determines that the received data stream is complete, or if the period of time allotted to this step passes, then the receive data function is complete.

The next step of the operation 400 is to parse data 410. The parse data step 410 attempts to transform the byte stream received in the receive data step 409 into a form suitable for storage in a database.

The transformed data from parse data step 410 is then stored in a database in step 411. The next step is to store the audit data from the command interaction with the managed device in the log session, step 412. The audit data is stored in a secured data store for later retrieval by audit functions.

The next step 413 in the overall process 400 is to determine whether there are additional commands that must be sent to the managed device to complete the requested operation (back in step 401). If there are additional commands to be sent to the managed device, the next action is to return to the connect function step. If there are not additional commands to be sent to the managed device, then the operation 400 is complete.

This management operation of the managing device is performed by the managing device specifically and particularly as to the each connected managed device. Moreover, the managing device performs this management operation at the LAN and without any external support or administration (unless the managing device then-determines that such external support or administration is appropriate or desired). Thus, the managing device, located at and operational with respect to the particular LAN and its devices and elements, is not dependent on centralized administration, and administers the network piece comprised of the LAN and its elements and devices in non-centralized manner from other LANs, elements, devices, and any WAN. Of course, as has been mentioned, centralized or remote from the LAN accessibility can still be possible with the managing device, and, in fact, the managing device can logically in certain instances make assessments and control and administer with external resources. However, the managing device eliminates the requirement that each and every administration operation be handled by a centralized administrator as has been conventional, and instead locally at the LAN administers the LAN in concert with other LANs of an aggregate enterprise network also each administered by a respective managing device in similar manner.

The foregoing managing device, and the systems and methods therefore, provide a number of operational possibilities. In effect, the typical Network Operations Center (NOC) in a centralized network administration arrangement is not required to administer the network via the managing device(s). Each individual managing device can administer a number of similarly located devices of a network, and multiple ones of the managing device(s) can be supplied to accommodate greater numbers of devices in the same or other locations. A local area network (or even one or more networked devices) that is located at a location remote from other network elements is administered via the managing device when thereat connected. This arrangement of the administrating managing device for addressing administration of each several network devices, where the managing device is located at the location of the several devices (rather than at a specific centralized location), enables a number of unique operations and possibilities via the managing device.

One unique operation for the managing device is the localized management of local devices of a LAN, at the location of the devices and not at any remote or other centralized administration location. Certain localized management operations of the managing device as to the connected local network devices include rollback of device configurations and settings in the event of inappropriate configuration changes, continuous monitoring of device configuration and performance, automated maintenance of devices, and security and compliance via secure connectivity (SSHv2), local or remote authentication, complete audit tracking of device interactions, and granular authorization models to control remote device access and management functions. All of these operations are possible because of the logical and functional operations of the managing device, and the particular system design and arrangement of the managing device, at the locale of networked devices connected to the managing device.

Moreover, the managing device provides nonstop management of connected network devices via the re-routing of management activity over the back-up or ancillary external network (or WAN) connection. As mentioned, in case the primary external network access is unavailable or interrupted at the managing device, the modem of the managing device provides an ancillary dial-up or similar path for external access. In operation, the managing device automatically re-routes management communications to the ancillary access path rather than the primary network access path upon occurrence of device, network, or power outages, as the case may be and according to the desired arrangement and configuration of the managing device. Additionally, the local autonomous management functions of the managing device are unaffected by the unavailability of the primary data network, since the managing device can use the console communications path to communicate with the managed device.

Other operations of the managing device when connected to devices include, automatic, manual, or directed distributed configuration management for the devices connected to the managing device. For example, in an enterprise network having a centralized administrator and database, the managing device, as it manages devices remote from the centralized location, communicates configuration and setting information for devices and the remote localized network to the centralized administrator and database for an enterprise network. In such an arrangement, the managing device provides primary administration for the connected devices and network, and the centralized administrator and database can continue to administer the enterprise generally, such as where the managing device does not/can not handle management or where back-up or centralization of administration operations are nonetheless desired.

Another operation of the managing device provides dynamic assembly of drivers for connected devices and networks to the managing device. For example, the managing device, automatically or otherwise, logically discerns connected devices and drivers appropriate for such devices, including updates and the like, as well as for initialization on first connection. This limits error or problems in set-up and configuration at the connected devices and network and manages such items at any remote locations. The database and logical operations of the managing device, at the locale, dynamically assemble drivers for multitudes of devices and localized network implementations, in accordance with design and arrangement of the managing device.

The managing device additionally enables various applications to be run and performed at the locale of the connected devices and localized network. These applications include a wide variety of possibilities, such as, for example, data collection with respect to devices, usage and performance, e-bonding, QoE, decision-making for management of the local devices and network, and the like. Of course, the possibilities for such applications is virtually limitless with the concept of localized administration and application service via the managing device for the connected devices and network elements.

A wide variety and many alternatives are possible in the use, design, and operation of the managing device, and the LANs, devices, elements, and other administered matters described in connection therewith.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for autonomously managing one or more local managed devices collocated with the apparatus, comprising:
   a console communication interface respective to each of the managed devices and independent of all other interfaces to managed devices and networks, the console communication interface providing a direct connection to the managed devices; and
   a controller configured to cause one or more operations to be carried out on one or more of the managed devices via the console communication interface.

2. The apparatus according to claim 1 further comprising:
   a first communication interface configured to be connected to a shared wide area or local area network; and
   a second communication interface configured to be connected to a point to point network established autonomously if the first communication interface is not responsive, the second communication interface configured to communicate with an external device not being any of the managed devices and not necessarily located in the locale of the managed devices.

3. The apparatus according to claim 2 further comprising a network communication heartbeat generator, wherein the controller is further configured to cease communicating using the first communication interface and communicate using the second communication interface at times the heartbeat generator indicates that the external device is non-responsive.

4. The apparatus according to claim 3 wherein the controller is further configured to attempt to communicate via the external device using the first communication interface and cease communication via the second communication interface, and resume communication using the first communication interface at times the heartbeat generator indicates that the external device is responsive via the first communication interface.

5. The apparatus according to claim 1 further comprising an embedded, local and operatively connected database, not accessible to the managed devices, configured to store information regarding the apparatus and the managed devices.

6. The apparatus according to claim 1 further comprising a power control interface configured to be connected operatively to a power control device, and wherein the controller is further configured to control power to managed devices powered by the power control device via the power control device.

7. The apparatus according to claim 1 further comprising a watchdog means configured to reset the apparatus at times the watchdog means indicates that the controller is non-responsive.

8. The apparatus according to claim 1 wherein the controller is further configured to generate synthetic transactions to one or more remote wide area or local area network devices and receive or observe results of the synthetic transaction from one or more of the remote devices, capture temporal or transactional information for the synthetic transaction, compute service levels for the synthetic transactions, and store the temporal, transactional or service levels for the synthetic transactions to memory.

9. The apparatus according to claim 1 wherein the controller includes remote service level monitoring means.

10. The apparatus according to claim 1 wherein the controller includes command line interpreter means.

11. The apparatus according to claim 10 wherein the controller is further configured to obtain an operation to be processed for one of the managed devices, authorize the operation, connect to the managed device via the console communication interface, detect a state of the managed device via the console communication interface, transmit the operation to the managed device via the console communication interface, receive data indicative of execution of the operation from the managed device via the console communication interface, parse the operation's results, store the operation's results to a database, and log an occurrence and results of the operation to the database.

12. The apparatus according to claim 11 wherein the controller is further configured to detect automatically a failure state of one of the managed devices and restore the failed managed device to an operational state.

13. The apparatus according to claim 11 wherein the controller is further configured to restore an operating system image when a low-level boot state indicates that an operating system is missing or bad and boot the failed managed device using the restored operating system image.

14. A method for autonomously managing one or more locally managed devices collocated with a managing device, the method comprising:
   establishing a console communication connection to at least one managed device to be managed, the console communication connection respective to each of the managed devices and independent of all other connections to managed devices and networks, the console communication connection further providing a direct connection to the managed devices; and
   carrying out one or more operations on one or more of the managed devices to manage the one or more collocated locally managed devices.

15. The method according to claim 14 further comprising:
   detecting failure of a first communication connection to a shared wide area or local area network; and
   establishing autonomously a second point to point communication connection to an external device, the external device not being any of the managed devices.

16. The method according to claim 15 further comprising:
   generating a network communication heartbeat signal;
   detecting times communications using the first communication connection cease; and communicating using the second communication connection at times the communication heartbeat signal indicates that the external device is non-responsive.

17. The method according to claim 16 further comprising:
attempting to communicate via the external device using the first communication connection;
ceasing attempting to communicate via the second communication connection; and
resuming communication using the first communication connection at times the communication heartbeat signal indicates that the external device is responsive via the first communication connection.

18. The method according to claim 14 further comprising retrieving or storing database information regarding a managing device or the managed devices, the database information not accessible to the managed devices.

19. The method according to claim 14 further comprising controlling power applied to managed devices powered by a power control device via the power control device.

20. The method according to claim 14 further comprising:
generating a watchdog signal; and
performing a reset when the watchdog signal indicates non-responsiveness.

21. The method according to claim 14 further comprising:
generating synthetic transactions to one or more remote wide area or local area network devices;
receiving results from or observing the results of said synthetic transactions from one or more of said remote devices;
capturing temporal or transactional information for said synthetic transactions;
computing service levels for said synthetic transactions; and
storing said temporal, transactional or service levels for said synthetic transactions.

22. The method according to claim 14 further comprising monitoring remote service levels.

23. The method according to claim 14 further comprising communicating with the managed device via a command line interpreter.

24. The method according to claim 23 further comprising:
obtaining an operation to be processed for one of the managed devices;
authorizing the operation;
connecting to the managed device via the console communication connection;
detecting a state of the managed device via the console communication connection;
transmitting the operation to the managed device via the console communication connection;
receiving data indicative of execution of the operation from the managed device via the console communication connection;
parsing the operation's results;
storing the operation's results; and
logging an occurrence and results of the operation.

25. The method according to claim 24 further comprising:
automatically detecting failure of one of the managed devices; and
restoring the failed managed device to an operational state.

26. The method according to claim 24 further comprising:
restoring an operating system image of a failed managed device at times a low-level boot state indicates that the operating system is missing or bad; and
booting the failed managed device using the restored operating system image.

\* \* \* \* \*